US012761076B2

(12) United States Patent
Mullins et al.

(10) Patent No.: US 12,761,076 B2
(45) Date of Patent: Oct. 13, 2026

(54) GYRO STABILIZED MODULAR LASER MEASUREMENT DEVICE

(71) Applicant: The United States of America, as represented by the Secretary of the Navy, Crane, IN (US)

(72) Inventors: Marshall A. Mullins, Bloomington, IN (US); Charles R. Upton, Jasper, IN (US); Tyler Fitzsimmons, Bloomington, IN (US); Joseph Morris, Bloomington, IN (US)

(73) Assignee: The United States of America, as represented by the Secretary of the Navy, Washington, DC (US)

(*) Notice: Subject to any disclaimer, the term of this patent is extended or adjusted under 35 U.S.C. 154(b) by 145 days.

(21) Appl. No.: 18/619,358

(22) Filed: Mar. 28, 2024

(65) Prior Publication Data

US 2025/0035485 A1 Jan. 30, 2025

Related U.S. Application Data

(63) Continuation of application No. 18/197,425, filed on May 15, 2023, now Pat. No. 11,976,969.

(51) Int. Cl.

| | |
|---|---|
| ***G01J 3/02*** | (2006.01) |
| ***G01J 3/28*** | (2006.01) |
| ***G01J 5/02*** | (2022.01) |
| ***G01J 5/12*** | (2006.01) |

(52) U.S. Cl.

CPC ............... *G01J 3/0202* (2013.01); *G01J 3/28* (2013.01); *G01J 5/0205* (2013.01); *G01J 5/12* (2013.01)

(58) Field of Classification Search

CPC .......... G01J 3/0202; G01J 3/28; G01J 5/0205; G01J 5/12; G01J 2003/2826; G01J 5/0816

See application file for complete search history.

(56) References Cited

U.S. PATENT DOCUMENTS

| | | | | | |
|---|---|---|---|---|---|
| 5,551,244 | A * | 9/1996 | Bailey | F25B 21/02 62/3.2 | |
| 5,721,430 | A * | 2/1998 | Wong | G01N 21/3518 250/338.5 | |

* cited by examiner

*Primary Examiner* — Thanh Luu
*Assistant Examiner* — Mai Thi Ngoc Tran
(74) *Attorney, Agent, or Firm* — Naval Surface Warfare Center, Crane Division; Christopher Feigenbutz

(57) ABSTRACT

Provided is a gyroscope stabilized gimbal assembly for collecting and timestamping video data and laser measurement data. The assembly can be used on multiple platforms and provides an ISR video camera system and one or more laser measurement devices, including photodetectors, thermopiles, filters, and analog to digital converters. The components are mounted to a bracket that can be installed and removed from the assembly to collect/record measurement data from the devices interacting with the laser beam. A processor collects and records measurement data from the devices interacting with the laser beam and calculates optical power data, irradiance data, and wavelength data. A storage device stores a first set of data comprising video data from said camera system and a second set of data comprising optical power data, irradiance data, and wavelength data, wherein said first and second set of data are timestamped, separated, and not comingled.

16 Claims, 5 Drawing Sheets

GYRO STABILIZED MODULAR LASER MEASUREMENT DEVICE

CROSS-REFERENCE TO RELATED APPLICATIONS

The present application is a continuation of U.S. Non Provisional patent application Ser. No. 18/197,425, filed May 15, 2023, entitled "GYRO STABILIZED MODULAR LASER MEASUREMENT DEVICE," which claims priority to U.S. Provisional Patent Application Ser. No. 63/341,500, filed May 13, 2022, entitled "GYRO STABILIZED MODULAR LASER MEASUREMENT DEVICE," the disclosure of which is expressly incorporated by reference herein.

STATEMENT REGARDING FEDERALLY SPONSORED RESEARCH OR DEVELOPMENT

The invention described herein was made in the performance of official duties by employees of the Department of the Navy and may be manufactured, used and licensed by or for the United States Government for any governmental purpose without payment of any royalties thereon. This invention (Navy Case 210866US03) is assigned to the United States Government and is available for licensing for commercial purposes. Licensing and technical inquiries may be directed to the Technology Transfer Office, Naval Surface Warfare Center Crane, email: Crane_T2@navy.mil.

FIELD OF THE INVENTION

The field of invention relates generally to measuring systems. More particularly, it pertains to a gyroscope stabilized gimbal assembly for collecting and timestamping video data and laser measurement data.

BACKGROUND

Currently known and available gyroscope stabilized gimbal assemblies include Intelligence, Reconnaissance, and Surveillance (ISR) imaging systems that are used to collect image data (video and photo). These systems cannot capture image data and laser characteristics (wavelength, power, etc.) in field use at the same time with one device. These limitations have required the use of measurement systems that are completely separate of the ISR imaging system, thus data collection of wavelength, power, etc. that is time stamped and synced with the ISR imaging system has not been achieved. In other words, these systems cannot measure laser characteristics (wavelength, power, etc.) and collect video with the use of a single system. As can be appreciated, systems that only collect laser characteristics are limited in usefulness as they are typically static and sometimes not aligned with the incoming laser beam facing testing platform (therefore measurements have not been taken and requirements that needed verification have not been verified). The need to collect video data and laser data (laser measurements with laser characteristics) from the same ISR imaging system is paramount to field testing in many civilian and military applications.

SUMMARY OF THE INVENTION

The present invention relates to a gyroscope stabilized gimbal assembly for collecting and timestamping video data and laser measurement data. The gimbal assembly can be used on multiple platforms (stationary, vehicle, ship, aircraft) and provides an ISR video camera system (visible and mid-wave infrared) and one or more laser measurement devices (i.e., photodetectors, laser line filters, and thermopiles). In addition to video data, the assembly provides timestamped data including laser wavelength data, laser power data, laser irradiance data, and the like.

Measurements are achieved by keeping the measurement devices aimed at the laser throughout the measuring timeframe. Aiming is accomplished via elevation and azimuth controls within the ISR system that work in combination with the gyro-stabilized platform to keep the measurement devices "floating" similar to the cameras native to the ISR system. A processor collects and records the measurement data from the devices interacting with the laser beam.

The processor runs a script to provide a graphic user interface showing the raw data to the operator, which provides feedback during a laser test and evaluation event, thereby allowing the operator to ascertain in real time if the laser is actually on target with the measurement device as opposed to waiting until after the event to find out that data was not collected. The assembly further provides the ability to actively steer the ISR imaging system and to have the measurement devices actively track the laser emission, which improves the data collection process.

Components, such as photodetectors, filters, thermopile power meters, analog to digital converters, and compact computers can be installed and removed to collect/record the measurement data from the devices interacting with the laser beam. The system provides the ability to change out measurement devices for different laser requirements to be verified, thus canceling out aircraft turbulence.

Additional features and advantages of the present invention will become apparent to those skilled in the art upon consideration of the following detailed description of the illustrative embodiment exemplifying the best mode of carrying out the invention as presently perceived.

BRIEF DESCRIPTION OF THE DRAWINGS

The detailed description of the drawings particularly refers to the accompanying figures in which.

DETAILED DESCRIPTION OF THE DRAWINGS

Figure 1:
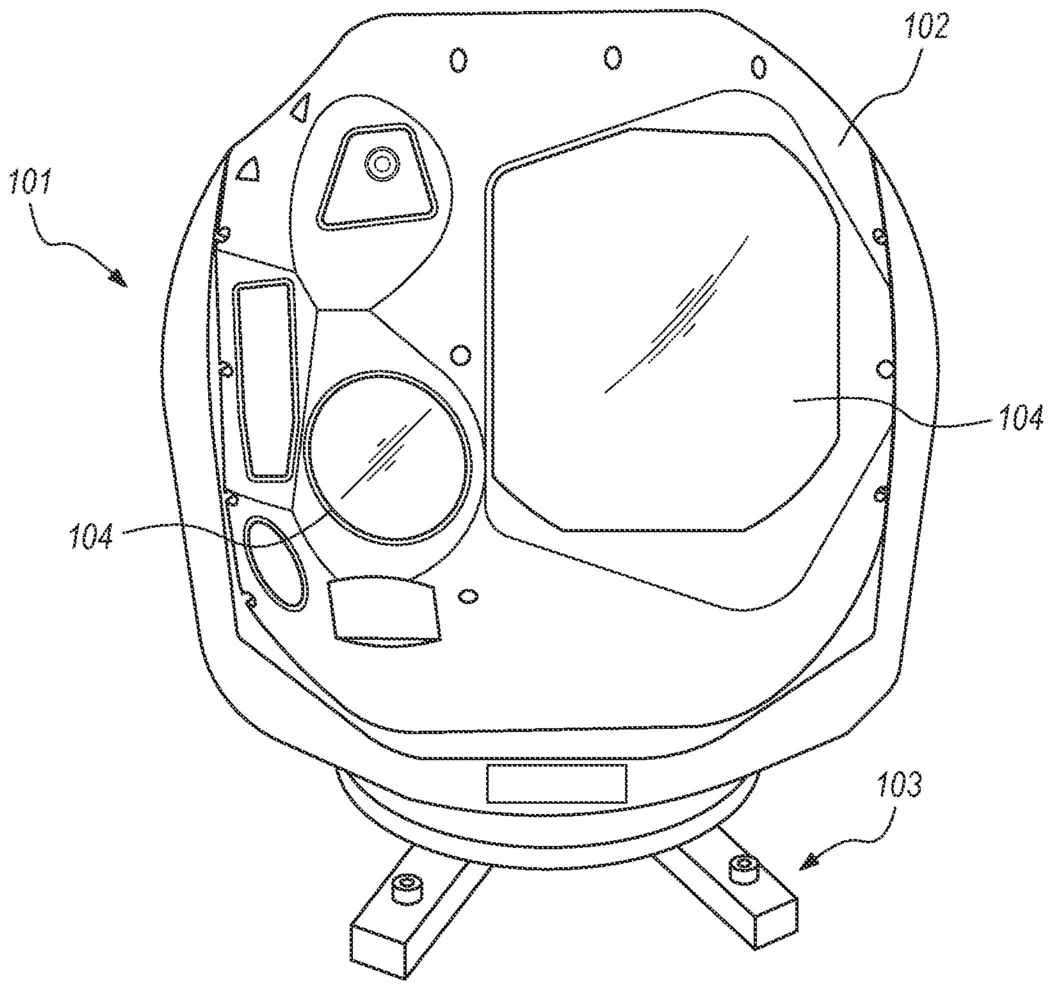
FIG. 1 shows a view of a gyroscope stabilized gimbal assembly.

The embodiments of the invention described herein are not intended to be exhaustive or to limit the invention to precise forms disclosed. Rather, the embodiments selected for description have been chosen to enable one skilled in the art to practice the invention.

Generally, provided is a gyroscope stabilized gimbal assembly for collecting video data and laser measurement data comprising: a gimbal housing comprising one or more windows and a mounting system; a camera system; a drop in laser system comprising; a first and a second wavelength dependent photodetector; a first replaceable laser line filter mounted to the first wavelength dependent photodetector and a second replaceable laser line filter mounted to the second wavelength dependent photodetector; an adjustable electronic gain for adjusting sensitivity levels of the first and a second wavelength dependent photodetector; a first and a second replaceable temperature dependent thermopile power meter; a third replaceable laser line filter mounted to the first replaceable temperature dependent thermopile power meter and a fourth replaceable laser line filter mounted to the second replaceable temperature dependent thermopile power meter; a mounting bracket for securing the first and second wavelength dependent photodetectors and the first and second thermopiles in an orientation to enable capture of electromagnetic data through the one or more windows of the gyroscope stabilized gimbal assembly; an analog to digital converter; a processor; and a storage device; wherein the camera system captures visible and mid-wave infrared video data; wherein the first wavelength dependent photodetector operates in a first electromagnetic spectrum range and provides a first voltage reading based on a first detected electromagnetic spectrum wavelength, and the second wavelength dependent photodetector operates in a second electromagnetic spectrum range and provides a second voltage reading based on a second detected electromagnetic spectrum wavelength; wherein the first through fourth replaceable laser line filters are selected for specific laser wavelengths; wherein the first replaceable temperature dependent thermopile power meter operates in a first electromagnetic spectrum range and provides a first optical power reading based on a first detected temperature and the second replaceable temperature dependent thermopile power meter operates in a second electromagnetic spectrum range and provides a second optical power reading based on a second detected temperature; wherein the analog to digital converter extracts the first and second voltage signals from the first and second photodetectors and assigns a first and a second numerical voltage value; wherein the processor compares the first and second numerical voltage values, the first and second optical power readings, wavelength information from the first and second wavelength dependent photodetectors and from the first and second replaceable temperature dependent thermopiles, a first gain setting from the first wavelength dependent photodetector, and a second gain setting from the second wavelength dependent photodetector, and calculates optical power data, irradiance data, and wavelength data; wherein the storage device stores a first set of data comprising video data from the camera system and a second set of data comprising optical power data, irradiance data, and wavelength data, wherein the first and second set of data are timestamped, separated, and not comingled.

In an illustrative embodiment, the laser measurement data comprises laser wavelength data, laser power data, and laser irradiance data. In an illustrative embodiment, the laser measurement data comprises pulsed laser characteristics comprising pulse width, frequency, and waveform. In an illustrative embodiment, the mounting bracket comprises a surface mount and a riser mount for securing the first and second wavelength dependent photodetectors and the first and second thermopiles in an orientation to enable capture of electromagnetic data through the one or more windows of the gyroscope stabilized gimbal assembly. In an illustrative embodiment, the laser line filters are replaceable. In an illustrative embodiment, the laser line filters are selected based on a desired frequency range. In an illustrative embodiment, the mounting system mounts the assembly to a stationary location, a vehicle, a ship, or an aircraft. In an illustrative embodiment, the camera system is an Intelligence, Reconnaissance, and Surveillance imaging system. In an illustrative embodiment, the Intelligence, Reconnaissance, and Surveillance imaging system aims the first and second wavelength dependent photodetectors and the first and second replaceable temperature dependent thermopiles at a laser source during testing.

Also provided is a drop in laser system for a gyroscope stabilized gimbal assembly comprising: a first and a second wavelength dependent photodetector; a first replaceable laser line filter mounted to the first wavelength dependent photodetector and a second replaceable laser line filter mounted to the second wavelength dependent photodetector; an adjustable electronic gain for adjusting sensitivity levels of the first and a second wavelength dependent photodetector; a first and a second replaceable temperature dependent thermopile power meter; a third replaceable laser line filter mounted to the first replaceable temperature dependent thermopile power meter and a fourth replaceable laser line filter mounted to the second replaceable temperature dependent thermopile power meter; and a mounting bracket for securing the first and second wavelength dependent photodetectors and the first and second thermopiles in an orientation to enable capture of electromagnetic data through the one or more windows of the gyroscope stabilized gimbal assembly.

The gyroscope stabilized gimbal assembly can be used on multiple platforms (stationary, vehicle, ship, aircraft) and provides both an ISR imaging system (visible and mid-wave infrared video and photo) along with one or more laser measurement devices within the assembly. The laser measurements provide data related to optical power, irradiance, and wavelength. The ISR system provides the operator with the ability to keep the measurement devices aimed at the laser throughout the engagement timeframe. This ability is due to the nature of the ISR system, which provides elevation and azimuth controls, and the gyro-stabilized platform to keep the measurement devices "floating", similar to the cameras native to the ISR system. Additionally, a processor is used internal to the ISR system to collect/record the measurement data from the devices interacting with the laser beam. The processor runs a script to provide the operator with a graphic user interface (GUI) which shows the raw data to the operator. The GUI data provides positive feedback, such that during a laser test & evaluation event, the operator can ascertain in real time if the laser is actually on target with the measurement device as opposed to waiting until after the event to find out that data was not collected.

Previous methods have taken the commercial off the shelf photodetectors and mounted these devices as stationary items to the platform under test (a target board, or a vehicle). As can be appreciated, this causes the device that collects the ISR effects data to be separate from the measurement device, sometimes at critical distances where the ISR can be subjected to a "hot spot" in the laser beam, while the stationary device is far enough away from the ISR location that the measurement system does not pick up the "hot spot". Additionally, previous methods require pre-alignment to make sure a test scenario is geometrically correct to collect the test data, which places restrictions on pre-planning of the tests and dictates highly choreographed flight profiles if the vehicle under test is an aircraft. The inventive system described herein provides the ISR cameras and the laser measurement devices in the same package, however, the data is separated in order to limit commingling of the data, and thus prevents the need for higher classification guidelines in military applications.

FIG. 1 shows a view of a gyroscope stabilized gimbal assembly 101. The device includes an Intelligence, Reconnaissance, and Surveillance (ISR) stabilized gimbal housing 102 and a mounting system 103. The mounting system 103 allows the gimbal assembly 101 to be mounted to one or more types of platforms, including stationary, vehicle, ship, aircraft, and the like. When mounted to an aircraft, the gyroscope stabilized gimbal assembly 101 is positioned such that the measurement devices are positioned orthogonally to the incoming laser emission, thus providing a high signal to noise ratio as compared to static devices mounted elsewhere on a test aircraft. The housing 102 further includes one or more windows 104 for light transmission to the interior on the housing 102, which allows the internal cameras and measurement devices to record electromagnetic spectrum data.

As the operator of the ISR system is collecting the ISR effects data from the laser testing and evaluation event (i.e. causing the ISR imaging system to be cooperatively looking at the laser source), the measurement system is capable of collecting the laser data at range, and is not dependent upon having the internal detectors mounted to a specific fixed angle to account for the geometry of the test. This provides flexibility for the test, lowers the overall pre-planning and flight path restrictions, and thus helps to save both range time and labor funding for the test. Data is saved automatically, and can be downloaded from the internal processor and storage device after the test is complete.

Figure 2:
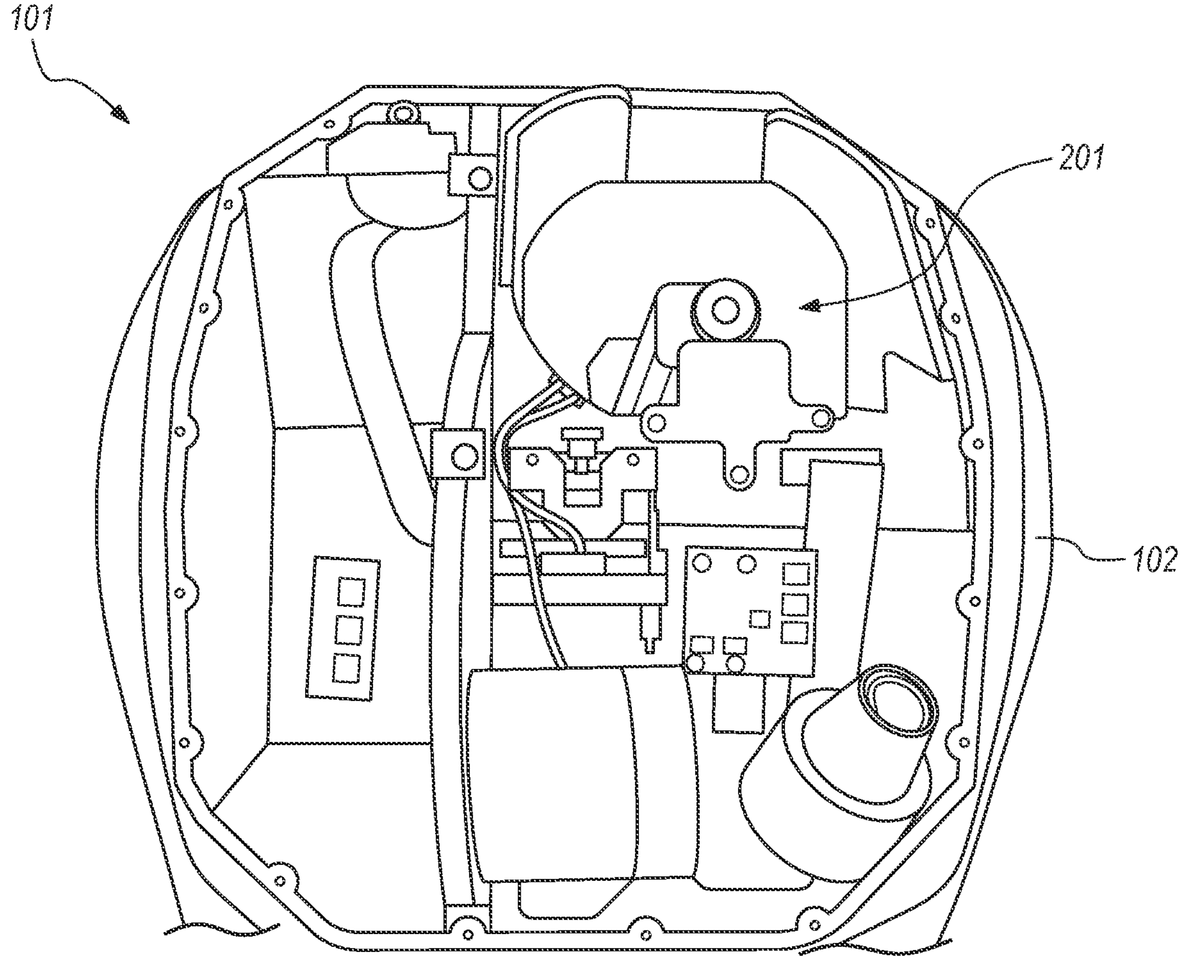
FIG. 2 shows an interior view of a gyroscope stabilized gimbal assembly with a camera system.

FIG. 2 shows an interior view of a gyroscope stabilized gimbal assembly 101 with a camera system 201. In an illustrative embodiment, the camera system 201 comprises an Intelligence, Reconnaissance, and Surveillance (ISR) imaging system. As can be appreciated, an ISR imaging system is designed for aerial imaging, and provides extended operating ranges and enhanced ruggedness. ISR cameras can capture images from air, land, or sea. In an illustrative embodiment, the ISR camera is mounted within the housing 102 to provide ISR imagery during a test. The gyroscope stabilized gimbal assembly 101 permits the operator to point the ISR camera at a desired target during a laser test to collect video during the laser measurement test, which will be explained in greater detail below. In an illustrative embodiment, the camera system 201 captures visible and mid-wave infrared video data.

Figure 3:
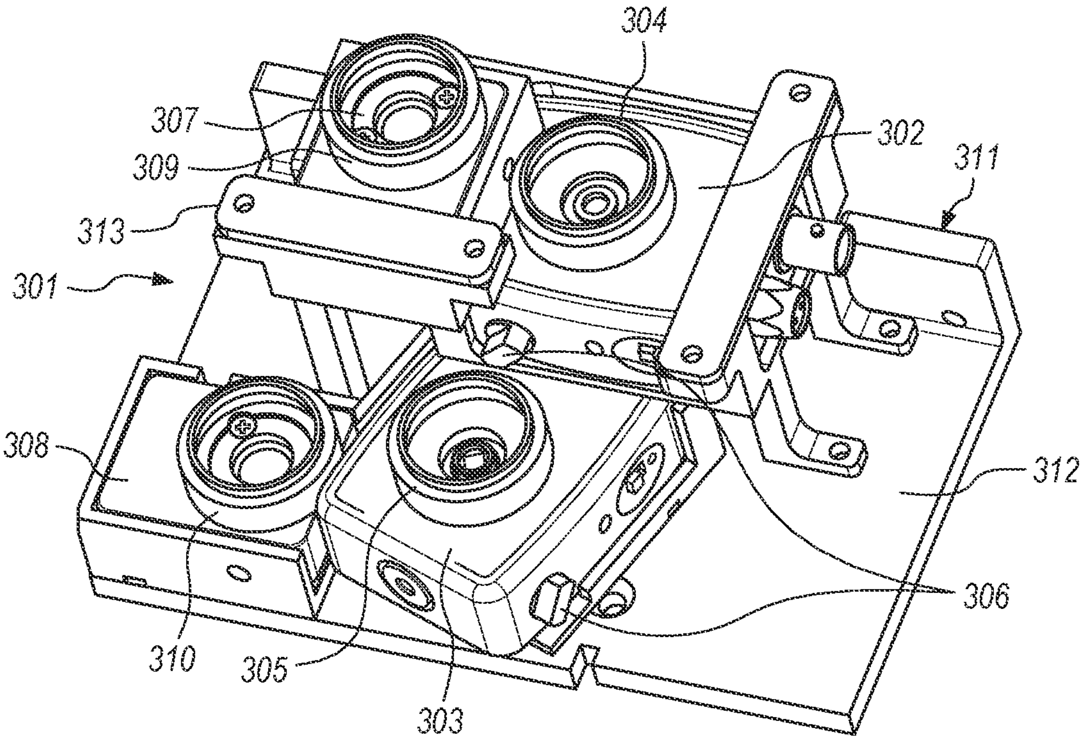
FIG. 3 shows a view of a drop-in laser system.
Figure 4:
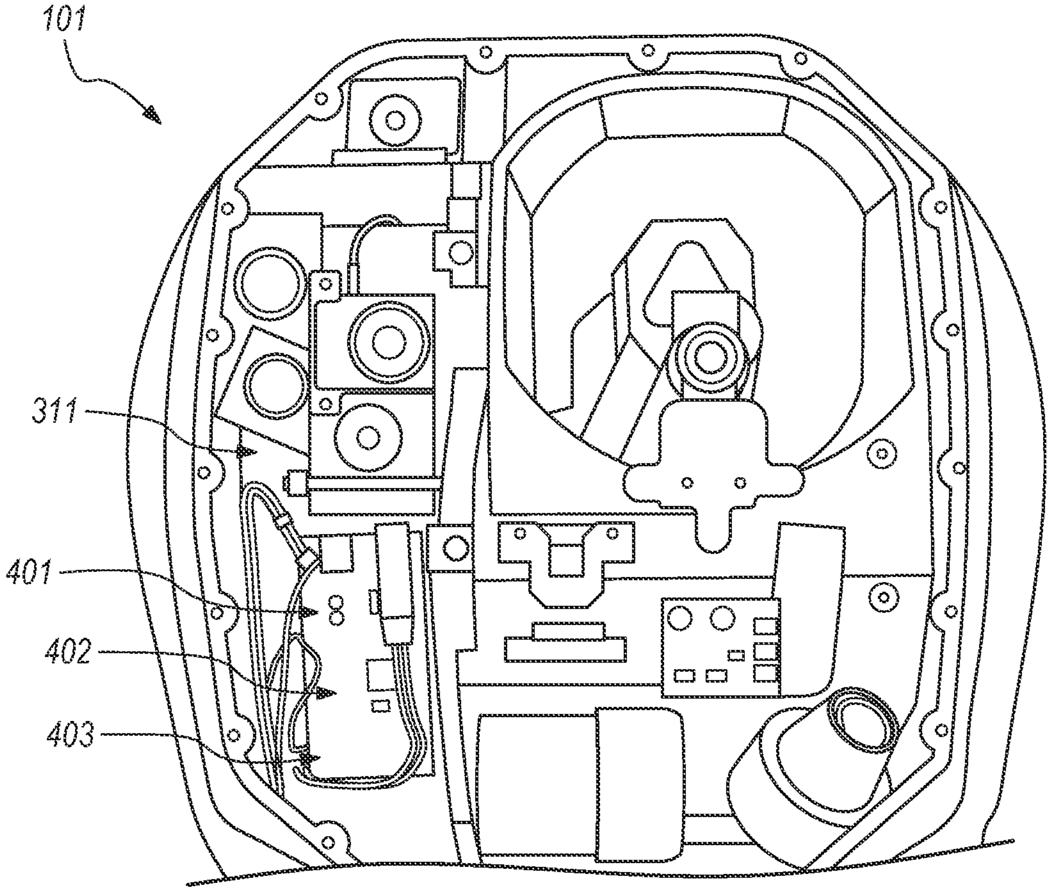
FIG. 4 shows an interior view of a gyroscope stabilized gimbal assembly with drop-in laser system installed therein.
Figure 5:
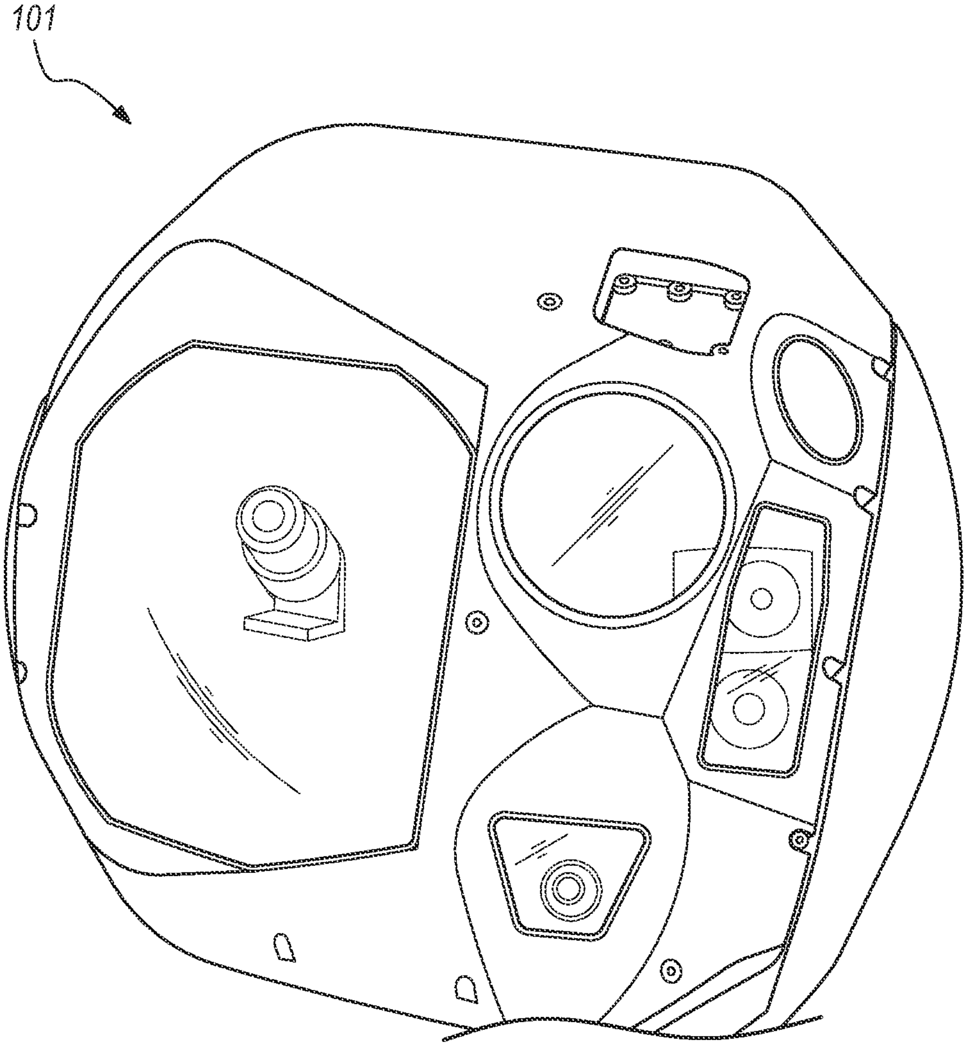
FIG. 5 shows a view of a gyroscope stabilized gimbal assembly window.

FIG. 3 shows a view of a drop-in laser system 301, and FIG. 4 shows an interior view of a gyroscope stabilized gimbal assembly 101 with drop-in laser system 301 installed therein. In an illustrative embodiment, the drop-in laser system 301 comprises a first and a second wavelength dependent photodetector 302, 303, a first replaceable laser line filter 304 mounted to the first wavelength dependent photodetector 302 and a second replaceable laser line filter 305 mounted to the second wavelength dependent photodetector 303, an adjustable electronic gain 306 for adjusting sensitivity levels of the first and second wavelength dependent photodetectors 302, 303, a first and a second replaceable temperature dependent thermopile power meter 307, 308, a third replaceable laser line filter 309 mounted to the first replaceable temperature dependent thermopile power meter 307 and a fourth replaceable laser line filter 310 mounted to the second replaceable temperature dependent thermopile power meter 308. In an illustrative embodiment, each component of the drop-in laser system 301 is modular and can be swapped out with a different component.

In an illustrative embodiment, the first and second wavelength dependent photodetectors 302, 303 are photodetectors can detect electromagnetic energy throughout the UV, VIS, NIR, IR, and THz spectral regions. In an illustrative embodiment, the photodetectors 302, 303 comprise sensors that can measure one or more of electromagnetic intensity, power, intensity distribution, wavefront shape, energy, and wavelength. In an illustrative embodiment, the first wavelength dependent photodetector 302 operates in a first electromagnetic spectrum range and provides a first voltage reading based on a first detected electromagnetic spectrum wavelength, and said second wavelength dependent photodetector 303 operates in a second electromagnetic spectrum range and provides a second voltage reading based on a second detected electromagnetic spectrum wavelength In an illustrative embodiment, the first and second replaceable temperature dependent thermopile power meters 307, 308 convert thermal energy into electrical energy and generate a voltage when the dissimilar metal components (thermocouples) are exposed to a temperature difference. The thermopiles 307, 308 obtain high-resolution measurements of the position and power of a laser beam. The thermopiles 307, 308 can provide an output in response to temperature, which can be utilized to determine laser data, such as optical power data, irradiance data, and wavelength data. The thermopiles 307, 308 can be used for close range or high power measurements that would cause the photodetector 302, 303 to saturate such that the actual measurement of the laser source cannot be obtained directly from the photodetector 302, 303. In an illustrative embodiment, the first replaceable temperature dependent thermopile power meter 307 operates in a first electromagnetic spectrum range and provides a first optical power reading based on a first detected temperature and the second replaceable temperature dependent thermopile power meter 308 operates in a second electromagnetic spectrum range and provides a second optical power reading based on a second detected temperature.

In an illustrative embodiment, the replaceable laser line filters 304, 305, 309, 310, also known as spectral or band-pass filters, help to limit undesirable electromagnetic emissions that can result in erroneous signals. The filters 304, 305, 309, 310 allow the passing of desired frequencies within a certain range and reject (attenuate) frequencies outside of the desired range. In an illustrative embodiment, the laser line filters 304, 305, 309, 310 are replaceable. In an illustrative embodiment, the laser line filters 304, 305, 309, 310 can be selected based on a desired frequency range. In an illustrative embodiment, each photodetector has a laser line filter mounted to the detector, which is selected for the specific laser wavelengths during a particular test. In an illustrative embodiment, the filters can be changed to accommodate additional laser tests, thereby providing enhanced modularity compared to known systems. In an illustrative embodiment, each photodetector 302, 303 has an adjustable electronic gain 306 that can be selected based on functionality as it adjusts the sensitivity level of the photodetector 302, 303 to accommodate for different testing conditions, such as range from the laser source and other testing restraints. In an illustrative embodiment, filters 304, 305, 309, 310 are selected for specific laser wavelengths.

The drop-in laser system 301 further comprises a mounting bracket 311 for securing the first and second wavelength dependent photodetectors 302, 303, and the first and second thermopiles 307, 308 in an orientation to enable capture of electromagnetic data through the windows 104 of the gyroscope stabilized gimbal assembly 101 (as best viewed in FIG. 1). In an illustrative embodiment, the mounting bracket 311 comprises a surface mount 312 and a riser mount 313 for securing the first and second wavelength dependent photodetectors 302, 303, and the first and second thermopiles 307, 308 in an orientation to enable capture of electromagnetic data through the windows 104 of the gyroscope stabilized gimbal assembly 101. The mounting bracket 311 can be dropped into and secured within gyroscope stabilized gimbal assembly 101, and can be quickly removed for the swapping of components.

The drop-in laser system 301 is modular in the fact that if one test has a set of lasers that are completely different from another test, the desired laser line filters and be installed at the detectors, and can obtain desired voltage signals from the devices for the new laser sources to be measured. In an illustrative embodiment, components, such as photodetectors, filters, thermopile power meters, analog to digital converters, and processors/computers can be installed and removed to collect/record the measurement data from the devices interacting with the laser beam. The system provides the ability to change out measurement devices for different laser requirements to be verified, thus canceling out aircraft turbulence.

Measurements are achieved by keeping the measurement devices aimed at a laser throughout the measuring timeframe. Aiming is accomplished via elevation and azimuth controls within the ISR system that work in combination with the gyro-stabilized platform to keep the measurement devices "floating" similar to the cameras native to the ISR system. In an illustrative embodiment, the Intelligence, Reconnaissance, and Surveillance imaging system aims the first and second wavelength dependent photodetectors and the first and second replaceable temperature dependent thermopiles at a laser source during testing. A processor collects and records the measurement data from the devices interacting with the laser beam.

In an illustrative embodiment, the system utilizes a commercial off the shelf analog to digital converter 401 that uses code to pull the voltage signal from the photodetectors and push the numerical value of the voltage (0-5 volts, with a resolution of microvolts (0.000001 Volts)). By knowing the voltage (read by the converter 401) from the photodetectors 302, 303, the wavelength of the laser, and the gain setting of the photodetectors 302, 303, a process or 402 can determine optical power measured at the photodetectors 302, 303. In an illustrative embodiment, the analog to digital converter 401 extracts first and second voltage signals from the first and second photodetectors 302, 303 and assigns a first and a second numerical voltage value.

In an illustrative embodiment, the processor 402 can run any required software stored on a storage device 403 (such as a local Solid State Drive (SSD)) that can be retrieved after the test is over for analysis. In an illustrative embodiment, the processor 402 can control the systems and components described herein, with a GUI ported to a monitor (not shown) for use by the operator. In an illustrative embodiment, the processor 402 compares the first and second numerical voltage values, the first and second optical power readings, wavelength information from the first and second wavelength dependent photodetectors and from the first and second replaceable temperature dependent thermopiles, a first gain setting from the first wavelength dependent photodetector, and a second gain setting the said second wavelength dependent photodetector, and calculates optical power data, irradiance data, and wavelength data. In an illustrative embodiment, the storage device 403 stores a first set of data comprising video data from the camera system and a second set of data comprising optical power data, irradiance data, and wavelength data, wherein the first and second set of data are timestamped, separated, and not comingled.

Although the invention has been described in detail with reference to certain preferred embodiments, variations and modifications exist within the spirit and scope of the invention as described and defined in the following claims.

The inventive system allows for the installation and removal of measurement devices for different laser requirements to be verified, thus canceling out aircraft turbulence. Additionally, with the ability to actively steer the ISR imaging system and the ability to have the measurement devices actively tracking the laser emission, the data collection process is greatly improved.

The invention claimed is:

1. A gyroscope stabilized gimbal assembly for collecting video data and laser measurement data comprising:

a gimbal housing comprising one or more windows and a mounting system;

a camera system; and a drop in laser system comprising;

a first replaceable temperature dependent thermopile power meter;

a second replaceable temperature dependent thermopile power meter;

a third replaceable laser line filter mounted to said first replaceable temperature dependent thermopile power meter; and a fourth replaceable laser line filter mounted to said second replaceable temperature dependent thermopile power meter;

a first wavelength dependent photodetector;

a second wavelength dependent photodetector;

a first replaceable laser line filter mounted to said first wavelength dependent photodetector and a second replaceable laser line filter mounted to said second wavelength dependent photodetector; and an adjustable electronic gain for adjusting sensitivity levels of said first and second wavelength dependent photodetectors;

a mounting bracket for securing said first and second thermopile power meters in an orientation to enable capture of electromagnetic data through one or more windows of said gyroscope stabilized gimbal assembly.

2. The gyroscope stabilized gimbal assembly of claim 1, further comprising an analog to digital converter;

a processor; and a storage device;

wherein said camera system captures visible and mid-wave infrared video data;

wherein said first wavelength dependent photodetector operates in a first electromagnetic spectrum range and provides a first voltage reading based on a first detected electromagnetic spectrum wavelength, and said second wavelength dependent photodetector operates in a second electromagnetic spectrum range and provides a second voltage reading based on a second detected electromagnetic spectrum wavelength;

wherein said first through fourth replaceable laser line filters are selected for specific laser wavelengths;

wherein said first replaceable temperature dependent thermopile power meter operates in a first electromagnetic spectrum range and provides a first optical power reading based on a first detected temperature and said second replaceable temperature dependent thermopile power meter operates in a second electromagnetic spectrum range and provides a second optical power reading based on a second detected temperature;

wherein said analog to digital converter extracts said first and second voltage signals from said first and second photodetectors and assigns a first and a second numerical voltage value;

wherein said processor compares said first and second numerical voltage values, said first and second optical power readings, wavelength information from said first and second wavelength dependent photodetectors and from said first and second replaceable temperature dependent thermopiles, a first gain setting from said first wavelength dependent photodetector, and a second gain setting from said second wavelength dependent photodetector, and calculates optical power data, irradiance data, and wavelength data;

wherein said storage device stores a first set of data comprising video data from said camera system and a second set of data comprising optical power data, irradiance data, and wavelength data, wherein said first and second set of data are timestamped, separated, and not comingled.

3. The gyroscope stabilized gimbal assembly of claim 2, wherein said laser measurement data comprises laser wavelength data, laser power data, and laser irradiance data.

4. The gyroscope stabilized gimbal assembly of claim 2, wherein said laser measurement data comprises pulsed laser characteristics comprising pulse width, frequency, and waveform.

5. The gyroscope stabilized gimbal assembly of claim 2, wherein said mounting bracket comprises a surface mount and a riser mount for securing said first and second wavelength dependent photodetectors and said first and second thermopiles in an orientation to enable capture of electromagnetic data through said one or more windows of said gyroscope stabilized gimbal assembly.

6. The gyroscope stabilized gimbal assembly of claim 2, wherein said laser line filters are replaceable.

7. The gyroscope stabilized gimbal assembly of claim 2, wherein said laser line filters are selected based on a desired frequency range.

8. The gyroscope stabilized gimbal assembly of claim 2, wherein said mounting system mounts said assembly to a stationary location, a vehicle, a ship, or an aircraft.

9. The gyroscope stabilized gimbal assembly of claim 8, wherein said camera system is an Intelligence, Reconnaissance, and Surveillance imaging system.

10. The gyroscope stabilized gimbal assembly of claim 8, wherein said Intelligence, Reconnaissance, and Surveillance imaging system aims said first and second wavelength dependent photodetectors and said first and second replaceable temperature dependent thermopiles at a laser source during testing.

11. A drop in laser system for a gyroscope stabilized gimbal assembly comprising:

a first replaceable temperature dependent thermopile power meter;

a second replaceable temperature dependent thermopile power meter;

a third replaceable laser line filter mounted to said first replaceable temperature dependent thermopile power meter; and a fourth replaceable laser line filter mounted to said second replaceable temperature dependent thermopile power meter;

a first wavelength dependent photodetector;

a second wavelength dependent photodetector;

a first replaceable laser line filter mounted to said first wavelength dependent photodetector and a second replaceable laser line filter mounted to said second wavelength dependent photodetector; and an adjustable electronic gain for adjusting sensitivity levels of said first and second wavelength dependent photodetectors;

a mounting bracket for securing said first and second thermopile power meters in an orientation to enable capture of electromagnetic data through one or more windows of said gyroscope stabilized gimbal assembly.

12. The gyroscope stabilized gimbal assembly of claim 11, wherein said laser measurement data comprises laser wavelength data, laser power data, and laser irradiance data.

13. The gyroscope stabilized gimbal assembly of claim 11, wherein laser measurement data comprises pulsed laser characteristics comprising pulse width, frequency, and waveform.

14. The gyroscope stabilized gimbal assembly of claim 11, wherein said mounting bracket comprises a surface mount and a riser mount for securing said first and second wavelength dependent photodetectors and said first and second thermopiles in an orientation to enable capture of electromagnetic data through said one or more windows of said gyroscope stabilized gimbal assembly.

15. The gyroscope stabilized gimbal assembly of claim 11, wherein said laser line filters are replaceable.

16. The gyroscope stabilized gimbal assembly of claim 11, wherein said laser line filters are selected based on a desired frequency range.

* * * * *